United States Patent [19]

Okamoto et al.

[11] Patent Number: 4,632,464
[45] Date of Patent: Dec. 30, 1986

[54] RIMMED WHEELS FOR USE IN VEHICLES WHEEL WITH STRESS RELIEF GROOVE FOR HUB BOLT

[75] Inventors: Satoru Okamoto; Hiroshi Ito, both of Kodaira, Japan

[73] Assignee: Bridgestone Corporation, Tokyo, Japan

[21] Appl. No.: 683,293

[22] Filed: Dec. 18, 1984

[30] Foreign Application Priority Data

Dec. 22, 1983 [JP] Japan .................. 58-240830

[51] Int. Cl.⁴ .................. B60B 3/04; B60B 11/06; B60B 23/00
[52] U.S. Cl. .................. 301/11 R; 301/13 SM; 301/36 R; 403/337; 403/408.1
[58] Field of Search .................. 301/10 R, 11 R, 13 R, 301/13 SM, 36 R, 63 R; 403/41, 337, 375, 388, 408.1; 411/531, 546, 368

[56] References Cited

U.S. PATENT DOCUMENTS

| | | | |
|---|---|---|---|
| 2,742,770 | 4/1956 | Graham | 403/337 X |
| 4,274,755 | 6/1981 | Bernasconi | 403/337 |

FOREIGN PATENT DOCUMENTS

| | | | |
|---|---|---|---|
| 2518933 | 7/1983 | France | 301/351 M |
| 247780 | 2/1964 | Netherlands | 403/408 |
| 601035 | 6/1978 | Switzerland | 301/63 R |

Primary Examiner—David A. Scherbel
Attorney, Agent, or Firm—Sughrue, Mion, Zinn, Macpeak & Seas

[57] ABSTRACT

A rimmed wheel for use in vehicles comprising a plurality of straight circle bolt holes in its disc portion is disclosed. In such a disc portion, a groove for mitigating a contact pressure between the disc portion and an outer flange edge of a flanged hexagon nut is formed at a position corresponding to the outer flange portion along at least an outer region of a pitch circle arranging the flanged hexagon nut at a given interval by die hobbing.

5 Claims, 6 Drawing Figures

RIMMED WHEELS FOR USE IN VEHICLES WHEEL WITH STRESS RELIEF GROOVE FOR HUB BOLT

BACKGROUND OF THE INVENTION

1. Field of the Invention

This invention relates to a rimmed wheel of a generally disc type for use in vehicles, particularly truck, bus and light-weight truck. More particularly, it relates to an improvement in a rimmed wheel which is mounted to a vehicle by driving a flanged hexagon nut into a hub bolt at a disc portion of the rimmed wheel, whereby the fatigue endurance of the disc portion is improved.

2. Description of the Prior Art

The rimmed wheel is mounted to the vehicle by clamping the disc portion through a hub bolt and a flanged hexagon nut fitted to a threaded leg thereof, wherein a plurality of straight circle holes or bolt holes each having an equal inner diameter over its entire length are formed in the disc portion at given intervals along a pitch circle coaxial to the disc portion. During the running of the vehicle, however, an external force applied to the disc portion repeatedly concentrates in an outer flange edge of the flanged hexagon nut, particularly outward the pitch circle arranging the bolt holes, where fatigue failure is frequently caused.

SUMMARY OF THE INVENTION

It is, therefore, an object of the invention to advantageously and simply overcome the aforementioned problem and to improve the fatigue endurance in this type of the rimmed wheel.

According to the invention, there is the provision of in a rimmed wheel for use in vehicles comprising a plurality of straight circle bolt holes formed in a disc portion at given intervals along a pitch circle caxial to the disc portion, through which the disc portion is mounted to the vehicle with hub bolts and flanged hexagon nuts fitted to threaded legs of the hub bolts, the improvement wherein the disc portion is provided with a groove for mitigating a contact pressure between the disc portion and the flanged hexagon nut at a position corresponding to the outer flange edge of each of the flanged hexagon nuts and along at least an outer region of the pitch circle, said groove being formed by die hobbing and having a narrow width extending inside and ouside of a radius of the flange.

In a preferred embodiment of the invention, the groove for mitigating the contact pressure is an arc or a ring coaxial to the bolt hole.

The term "die hobbing" for the formation of the groove used herein means a so-called indenting similar to a coining, which forcedly applies a compression plastic deformation to an outer surface of the disc portion retained and fixed to an anvil or a die through a punch having at its top the same male shape as the groove to be formed.

DESCRIPTION OF THE PREFERRED EMBODIMENTS

Figure 1:
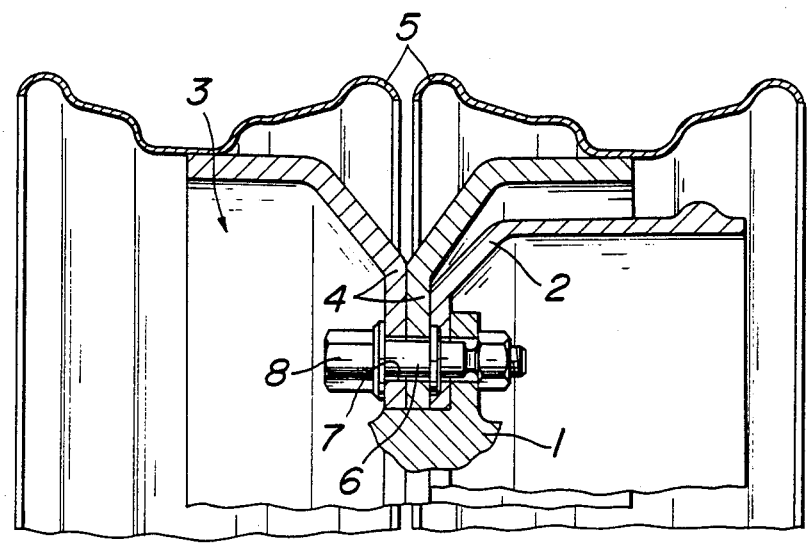
FIG. 1 is a schematic sectional view of a main part of the rimmed wheel.

In FIG. 1 is shown a main part of a disc-type rimmed wheel for use in a rear tire frequently used in a rear wheel of a truck, wherein numeral 1 is a hub, numeral 2 a brake drum, numeral 3 a rimmed wheel, numeral 4 a disc portion of the rimmed wheel, numeral 5 a rim portion thereof, numeral 6 a hub bolt, and numeral 7 a bolt hole.

In this embodiment, the hub bolt 6 is provided with a middle positioned flange and threaded legs located at both sides thereof. At the one side of the bolt, the hub 1 and the brake drum 2 are strongly clamped to each other between the middle positioned flange and inner nut, while the disc portion 4 coaxially fitted to the hub 1 is closely clamped at the other side to the end face of the brake drum through a flanged hexagon nut 8.

Figure 2:
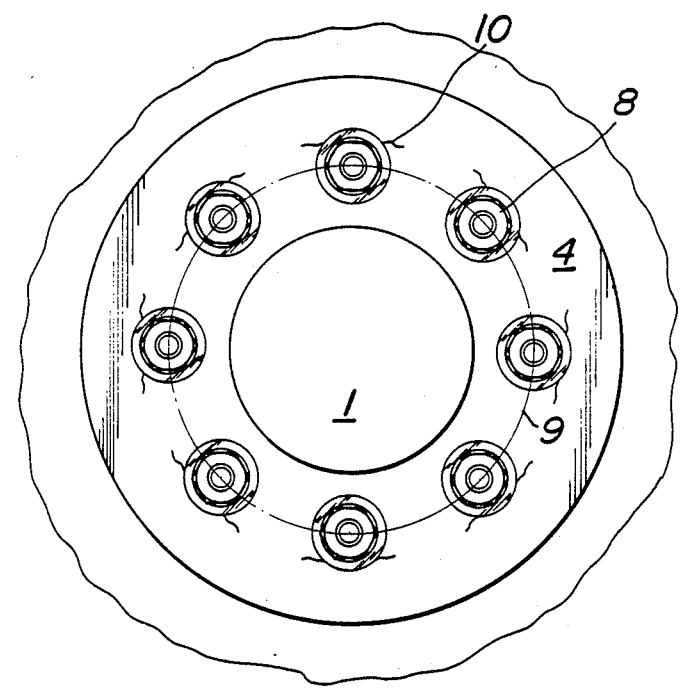
FIG. 2 is a side view of FIG. 1.

In FIG. 2 showing the outer surface of the disc portion 4, a uniform clamping is performed through a plurality of flanged hexagon nuts 8, for example, 8 to 10 flanged hexagon nuts, which are disposed at equal intervals along a pitch circle 9 coaxial to the disc portion 4.

When an external force, particularly transverse force is applied to a pneumatic tire (not shown) mounted on the rim portion 5, it is transferred from the rim portion 5 to the disc portion 4 and is apt to concentrate in that region of the disc portion which contacts with the outer flange edge of the flanged hexagon nut 8, whereby cracks as shown by numeral 10 in FIG. 2 are produced. The growth of such cracks frequently results in a fatigue failure of the disc portion.

Figure 3A:
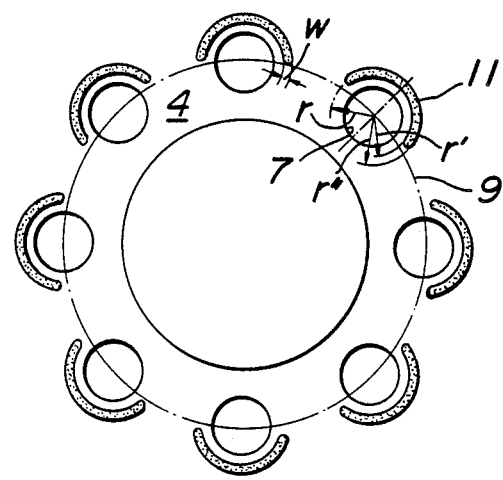
FIG. 3a and 3b are diagrammatic views of two embodiments of the disc portion provided with the groove according to the invention, respectively.
Figure 3B:
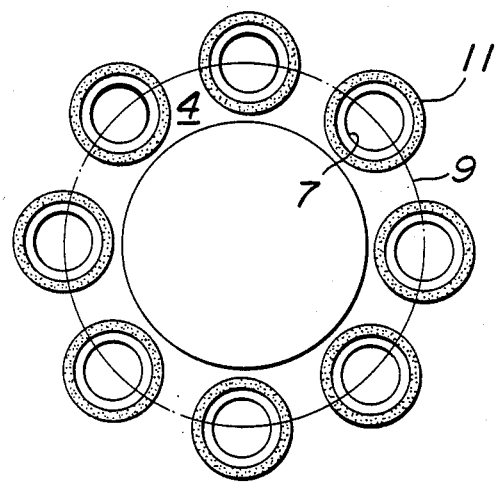

In order to effectively prevent such fatigue failure, according to the invention, the disc portion 4 is provided with a plurality of grooves 11 for mitigating a contact pressure between the disc portion 4 and the outer flange edge of the flanged hexagon nut 8 (hereinafter referred to as a contact pressure mitigating groove) as shown in FIGS. 3a and 3b.

The pressure contact mitigating groove 11 is formed in the disc portion 4 by die hobbing at a position corresponding to the outer flange edge of the flanged hexagon nut 8 along at least an outer region of the pitch cicle 9 in a narrow width w extending inside and outside a radius r depicted by the outer flange edge. In this case, the groove 11 may be an arc as shown in FIG. 3a or a ring as shown in FIG. 3b.

The die hobbing for the formation of the groove contributes to enhance the hardness of the grooved portion to suppress the occurrence of cracks. Also, the groove avoids the direct contacting with the outer flange edge and serves to prevent the concentration of stress in the disc portion contacting with the flange edge.

The depth of the contact pressure mitigating groove 11 is effective within a range of 1/50–1/20 with respect to a thickness t of the disc portion 4. The width w of the groove 11 is effective within a range of 2–6 mm extending from a radius r' smaller by 1–3 mm than a flange radius r of the flanged hexagon nut 8 to a radius r'' which is larger by 1–3 mm than the flange radius r.

Figure 4A:
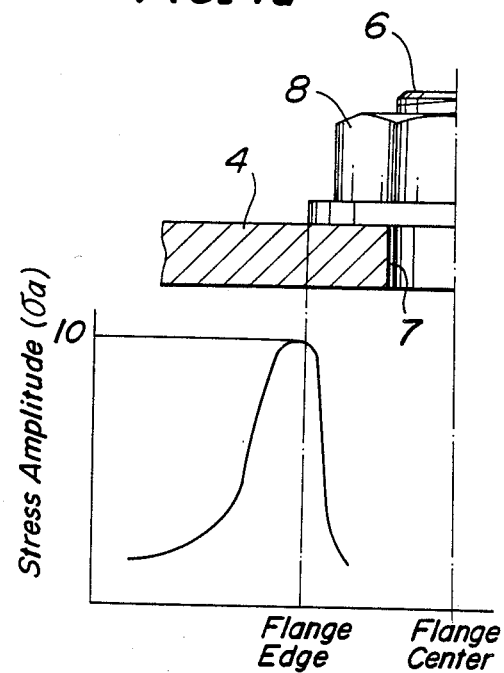
FIGS. 4a and 4b are graphs for the comparison of stress amplitude, respectively.
Figure 4B:
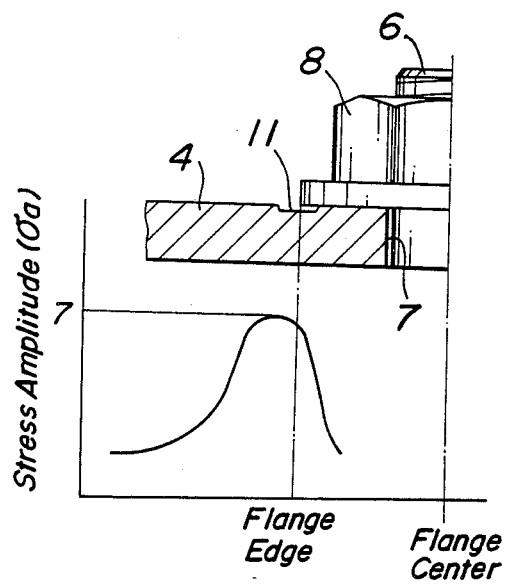

As a result of such die hobbing, the hardness in the vicinity of the contact pressure mitigating groove 11 is increased to about 20% as compared with the case that the hardness Hv of the disc portion is usually 135–155. Further, when comparing the stress distribution in the vicinity of the outer flange edge as shown in FIGS. 4a and 4b, the stress amplitude oa during the running under loading is reduced to about 30% as compared with that in the absence of the contact pressure mitigating groove.

As mentioned above, according to the invention, the fatigue endurance of the disc portion is considerably enhanced by the synergistic action of the fact that the outer flange edge of the flanged hexagon nut does not directly contact with the disc portion during the running under loading with the fact that the hardness of the non-contact part is increased by die hobbing, whereby the use life of the rimmed wheel is prolonged largely.

What is claimed is:

1. A rimmed wheel for use in vehicles comprising; a disk portion, a plurality of straight circle bolt holes formed in said disc portion at given intervals along a pitch circle coaxial to the disc portion, hub bolts and flanged hexagon nuts mounting the disc portion to the vehicle, said hub bolts having threaded legs , said disc portion provided with an arcuate groove for mitigating contact pressure between the disc portion and a flanged hexagon nut at a position corresponding to an outer flanged edge of each of the flanged hexagon nuts and along at least an outer region of the pitch circle, said arcuate groove being formed by die hobbing and having a narrow width extending inside and outside of a radius of the outer flanged edge.

2. The rimmed wheel according to claim 1, wherein said arcuate groove is a ring formed coaxial to the bolt hole.

3. The rimmed wheel according to claim 1, wherein said groove has a thickness corresponding to 1/50–1/20 of a thickness of the disc portion and a width extending from a radius smaller by 1–3 mm than a radius of the outer flange edge to a radius larger by 1–3 mm than the radius of the outer flange edge.

4. The rimmed wheel of claim 1, wherein 8–10 flanged hexagon nuts are spaced at equal intervals along said pitch circle.

5. The rimmed wheel of claim 1, wherein the hardness of said disc portion in a region of said groove is in the range of 162–186.

* * * * *